(12) United States Patent
Tomerlin et al.

(10) Patent No.: US 7,510,216 B2
(45) Date of Patent: Mar. 31, 2009

(54) BEADED TUBE QUICK DISCONNECT DEVICE

(75) Inventors: Reg Tomerlin, Los Angeles, CA (US); David S. Larner, Fountain Valley, CA (US)

(73) Assignee: Arrowhead Products Corporation, Los Alamitos, CA (US)

( * ) Notice: Subject to any disclaimer, the term of this patent is extended or adjusted under 35 U.S.C. 154(b) by 263 days.

(21) Appl. No.: 11/351,751

(22) Filed: Feb. 10, 2006

(65) Prior Publication Data

US 2007/0187950 A1  Aug. 16, 2007

(51) Int. Cl.
F16L 55/00 (2006.01)
(52) U.S. Cl. .............................. 285/86; 285/84; 285/315
(58) Field of Classification Search ................... 285/81, 285/84–86, 315
See application file for complete search history.

(56) References Cited

U.S. PATENT DOCUMENTS

| 2,775,927 | A | | 1/1957 | Wulle |
| 2,861,510 | A | | 11/1958 | Wulle |
| 4,838,584 | A | | 6/1989 | Dierksmeier |
| 5,209,523 | A | | 5/1993 | Godeau |
| 5,901,985 | A | | 5/1999 | Raatz |
| 6,155,607 | A | * | 12/2000 | Hewitt et al. .................. 285/81 |
| 6,195,910 | B1 | | 3/2001 | Robineau |
| 6,315,333 | B1 | | 11/2001 | Collins |

* cited by examiner

Primary Examiner—Aaron M Dunwoody
Assistant Examiner—Fannie Kee
(74) Attorney, Agent, or Firm—Fulwider Patton LLP

(57) ABSTRACT

A tubular and compressible seal attached to one tube and formed with a cowling projecting over a peripheral bead in a connector tube and formed with a radially inwardly projecting sealing ring engaging such connector tube. A constraining sleeve compresses the cowling and sealing ring against the connector tube.

20 Claims, 2 Drawing Sheets

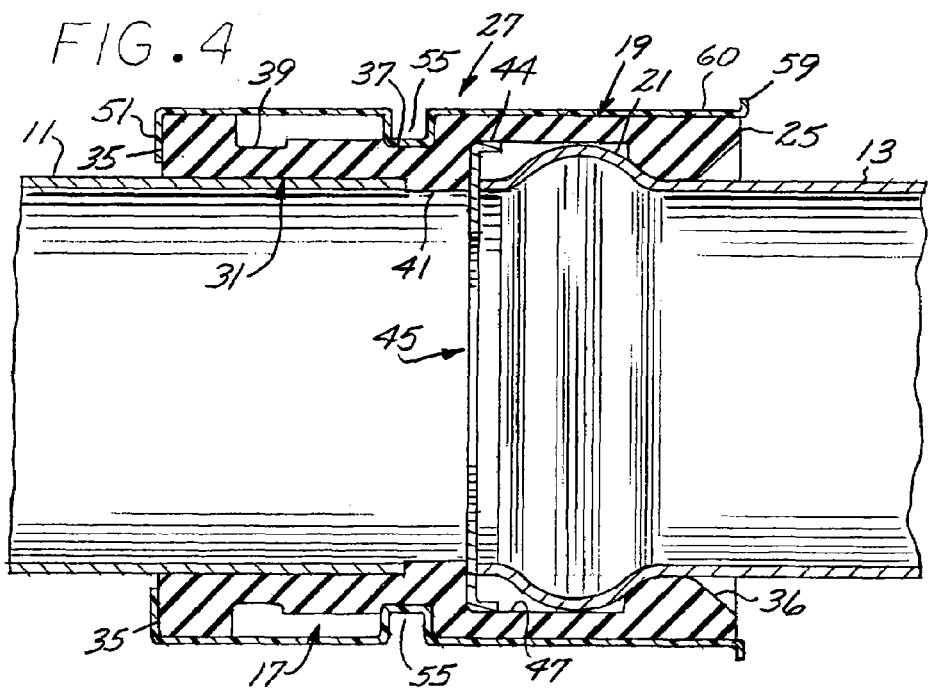
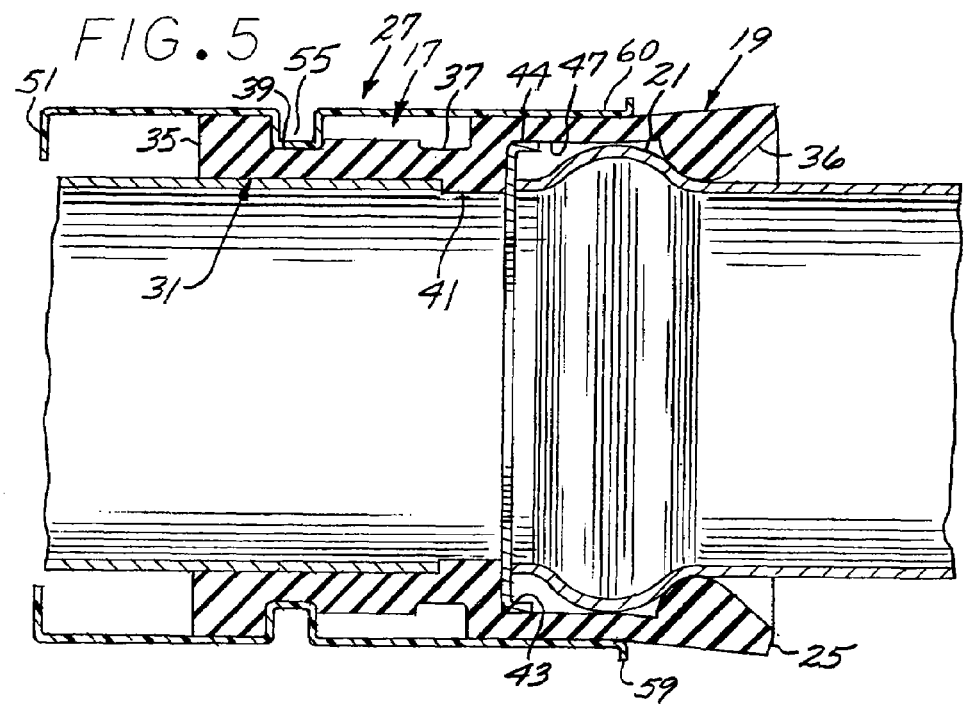

BEADED TUBE QUICK DISCONNECT DEVICE

BACKGROUND OF THE INVENTION

1. Field of the Invention

The present invention relates to connectors for connecting sections of ducting together.

2. Description of the Prior Art

Airframe construction in the aerospace industry typically employs numerous tubes and ducts for flowing fluids and gasses to different areas of the airframe for numerous different purposes. These ducts are utilized to convey moderate and high-pressure (5-100 psi) fluids and even partial vacuum within the aircraft. Sections of the ducts are connected together at various locations, often times as assembly of the air or spacecraft is nearing completion. It has been common practice to make these connections by forming a tube or duct with an exterior bead which may facilitate connection with a joining duct section by application of a metallic clamp over an adjoining cuff, typically with screw fasteners. The task of connecting tubes and ducts in this matter is time consuming and, considering the numerous number of such connections made in modern day jumbo aircraft, can add significantly to the labor costs and the expense of manufacture.

These prior art devices often employ a thin-walled rubber cuff reinforced by helically wound wire or other reinforcement and configured to be slid over a exterior bead on an adjoining tube or duct. An adjustable clamp such as a steel worm clamp is positioned in radial alignment spaced axially behind the bead and tightened to draw the cuff down on the connecting bead in an effort to provide a fluid tight seal. Such devices typically require some space about the tubing for the workman to rotate the clamp to make a firm final connection. Generally, prior art quick disconnect fittings of this type are of a relatively heavy construction, complex and bulky thus limiting usage in aircraft construction.

Many of these prior art connectors are designed to connect tubes together for conveying fluids under either positive or negative pressure, but not both.

There exists a need for a relatively inexpensive quick disconnect device for conveniently and positively connecting tube sections together in leak free fashion. It is this need to which the present invention is directed.

SUMMARY OF THE INVENTION

The quick disconnect of the present invention includes an elongated tubular seal device constructed to span the juncture point between first and second tubes wherein one of the tubes is formed with an exterior sealing bead. The seal device is mounted from the other tube but is configured with a cowling which passes over the bead and includes a radially inwardly projecting sealing ring which is compressed radially inwardly by means of a concentric shell constructed to slide axially over the cowling and press the ring radially inwardly against the one tube.

Other features and advantages of the invention will become apparent from the following detailed description, taken in conjunction with the accompanying drawings which illustrate, by way of example, the features of the invention

BRIEF DESCRIPTION OF THE DRAWINGS

FIG. 4 is a longitudinal sectional view, in enlarged scale, taken along the line 4-4 of FIG. 3 and showing the disconnecting in its coupling position; and FIG. 5 is a sectional view similar to FIG. 4 but depicting the disconnect apparatus in its uncoupled position.

DETAILED DESCRIPTION OF THE PREFERRED EMBODIMENTS

Figure 1:
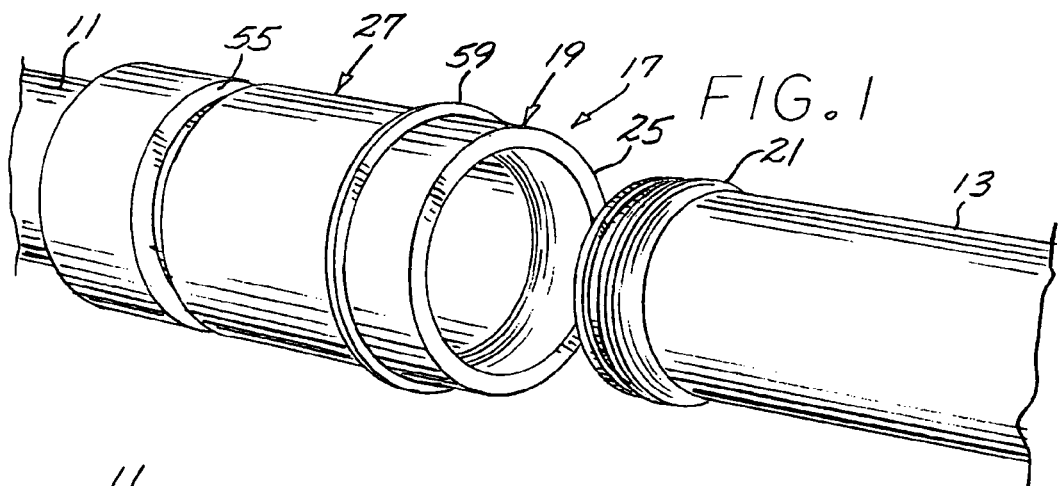
FIG. 1 is a perspective view of a pair of tubes to be connected together by the quick disconnect apparatus of the present invention.
Figure 2:
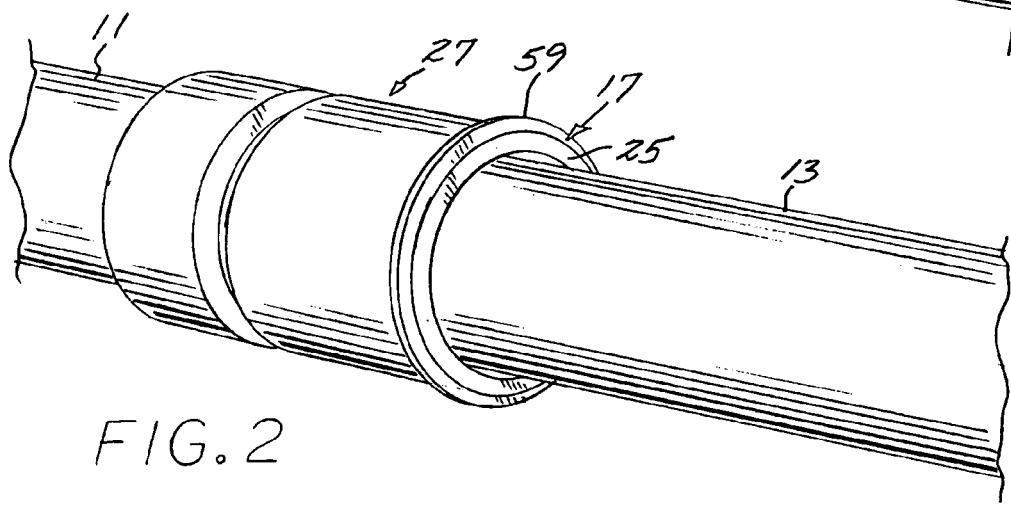
FIG. 2 is a perspective view similar to FIG. 1 but showing the tubes connected together.
Figure 3:
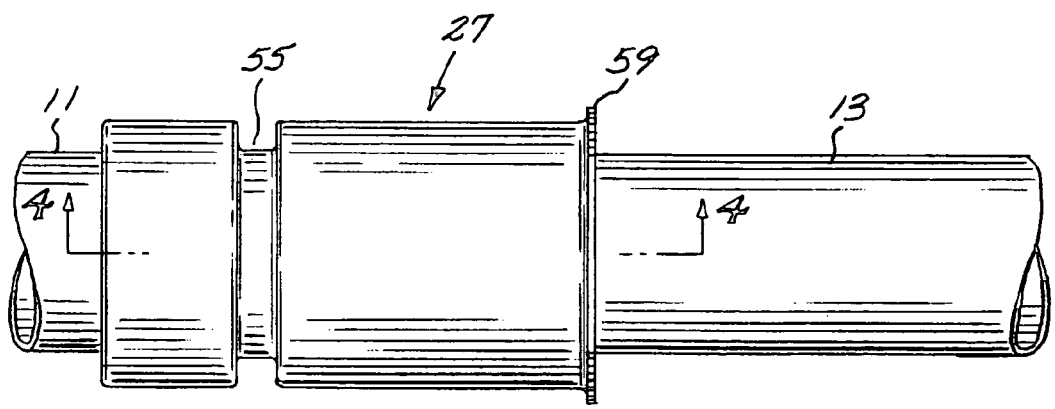
FIG. 3 is a front view of the quick disconnect shown in FIG. 2.

Ducts and tubing of widely varying diameters are used for circulating fluids in aerospace vehicles. The various ducts and tubing sections must be connected together during the assembly stage, often anytime when assembly of the overall vehicle is nearing completion and production time is of a concern. Tubes 11 and 13 typically have a diameter on the order of 2 to 3½ or 4 inches but may vary over broad ranges. The quick disconnect of the present invention includes, generally, a tubular seal device 17 mounted to the tube 11 and projecting axially therefrom to form a cowling 19 to be received slidably over a bead 21 formed in the tube 13 and, in practice, is formed at its open end with a radially inwardly projecting sealing ring 25 which is selectively pressed radially inwardly by means of a slider shell 27 to capture the bead 21 behind the ring 25 and compress such ring to form a fluid tight seal.

The bead 21 may be formed in the tube 13 or may be welded to the exterior surface thereof. The seal device 17 is formed at one extremity with a mounting cuff 31 received in tight fit relationship over the tube 11 and adhered thereto by a high temperature bond. In the preferred embodiment, the cuff 31 is configured at its one end with a radially outwardly projecting retainer flange 35 and has formed in axially spaced relationship therealong radially outwardly opening latching and unlatching grooves 37 and 39, respectively.

Such seal device is configured in axial spaced relationship between the ends of the respective tubes 11 and 13 with a radially inwardly projecting spacer rib 41 sandwiched between the ends of such tubes. The seal device is further configured in its interior curved step 43 which abuts against a curved cylindrical skirt 44 of a flow restrictor ring, generally designated 45, that projects radially inwardly to form a constricting orifice of a selected configuration within the interior of the space between the juncture of the tubes 11 and 13.

The seal device 17 is further formed with the cowling 19 projecting distally beyond the flow restrictor ring 45 and is formed with a radially inwardly opening annular relief notch 47 to be registered over, and clear the bead 21 when the seal is in its sealing position. The compressible sealing ring is then formed at its open end of the cowling with the ring 25 defining one annular side of such relief notch.

The seal device 17 will typically be constructed with its wall and the sealing ring 25 of sufficient radial thickness to cause the open extremity of the cowling to be, when fitted on the tube 11 flared radially outwardly to an exterior diameter larger than that of the inside diameter of the open end of the shell. The inner diameter of the shell collar is of a smaller diameter such that when fitted over the end of such outwardly splayed cowling 19 will cause such collar to constrain the free end of the cowling radially inwardly to press such ring against the tube 13 to form a fluid tight seal. The sealing ring may be formed in its free end with a frusto conical distally facing cam surface 36.

The shell 27 is generally cylindrically shaped and is formed on its mounting end with a radially inturned flange 51 which abuts against the annular shoulder formed by the radial surface of the retainer flange 35 at one end of the shell 27, the shell being of sufficient length to substantially encompass the outer surface of the seal. The shell 17 is formed medially with a radially inwardly pressed latching rib 55 which is configured to selectively engage one or the other of the respective latch or unlatch grooves 37 and 39, respectively. The shell 27 is formed at its distal extremity with an annular constraining collar 60 terminating in a radially outwardly turned reinforcing flange 59, FIGS. 4 and 5.

The seal device 17 is constructed of stretchable materials and is so arranged and configured that it will accommodate stretching of the sealing ring 25 to ride over the bead 21 and will afford sufficient radial body to such sealing ring 25 to provide for compression thereof when the shell is shifted to its latching position shown in FIG. 4. The magnitude of compression will be tailored to the particular applications but, in one preferred embodiment, for smaller diameter pipes on the order of 2½-3". The embodiment described herein has been found satisfactory. Preferably, the seal device is constructed of fire resistant material resistant to temperatures on the order of about 450° F. but at least up to 250° F. and may consist of silicon rubber. In the preferred embodiment, the seal device is constructed of a silicon rubber having a Durometer hardness of 45 on the A scale capable of withstanding stretch of an elongation of 400% or more without failure. One material found to be satisfactory for this application is formulation number 945-C-3375 available from Kirkhill Rubber 300 East Cypress, P.O. Box 1270, Brea, Calif. 92822.

The shell 27 is also preferably constructed of fire resistant material and may be of a composite pre-pregnated fiberglass cloth and an uncured phenolic resin. A material that has proven satisfactory for this application is a multiple ply fiberglass cloth available under the product designation CYOCM 3265 available from Cytec Industries, Inc., Five Garret, Mountain Plaza, West Patterson, N.J. 07424.

In operation, it will be appreciated that the duct sections or tubes 11 and 13 may be installed in the aircraft or other airframe vehicle and may be flexible and formed with custom turns and bends to fit the path through the vehicle. The bead 21 will be formed in the tube 13 during manufacture. In the event a flow restriction orifice is to be incorporated, the flow restrictor 45 may be positioned within the cowling before the tube 13 is moved into position relative to the tube 11. It will be appreciated that the mounting cuff 31 of the seal device is mounted or otherwise adhered to the tube 11 as by a silicon adhesive. An adhesive satisfactory for this application is product number 732 available from Dow Corning.

In practice, the seal device is constructed by high pressure molding to form the configuration desired for the grooves 37 and 39, the relief groove 47, spacer rib 41 and sealing ring 25. In assembly, if desirable, the shell may be fitted over the seal prior to the time the mounting sleeve is adhered to the tube 11 or may be telescoped there over after such adherence it being appreciated that there is sufficient compression in the body of the seal device to allow for sufficient compression so the latching rib 55 can ride along the exterior surface of such seal as it rides between such grooves 37 and 39 with shifting of the shell. In any event, when the tubes 11 and 13 are to be coupled together the shell may be shifted to its unlatched position shown in FIG. 5 with the latching rib 55 engaged in the detent formed by the groove 39 and the shell 27 free of the cowling. The tubes 11 and 13 may then be axially shifted together causing the frusto conically shaped caming surface 36 to ride up over the bead 21 allowing such bead to stretch the ring 25 to pass it over the bead and assume the position shown in FIG. 5 engaged behind the bead. The sealing ring 25 will serve to, when riding on the wall of the tube 13, flare the free end of the cowling radially outwardly to a diameter larger than the inside diameter of the sleeve constraining collar (FIG. 5). Thereafter, the shell will be slid to the latching position shown in FIG. 4 shifting the constraining collar over the bead 21 to compress the sealing ring 25 radially inwardly against the exterior surface of the tube 13 to thereby form a positive seal.

Thereafter, the passage within the tubes may be loaded with, for instance, pressurized fluid or even a partial vacuum and the combination of shell and seal will resist leakage. To this end, it will be appreciated should the tubes be pressurized, the fluid seeking to seep out under the sealing ring 25 will be resisted by the compression thereof. Similarly, in the event of a partial vacuum within the tubes, air seeking to seep under the sealing seep between the sealing ring 25 and outer surface of the tube 13 will be resisted by the compressive seal thereof.

Should it become necessary to uncouple the tubes, the workman may grasp the shell and slide it rearwardly on the tube 11 causing the rib 55 to disengage from the groove 37 allowing such sleeve to be drawn rearwardly to disengage the free end of the shell 27 from registration with the sealing ring to free the open end of such collar to expand and pass over the bead as the tubes are drawn apart.

It has been determined that the quick disconnect disclosed in the preferred embodiment will withstand relatively high pressures and temperatures, resisting temperatures of over 250° F. for extended periods of time and have been determined sufficient to pass FAA regulation FAR 25.856 for flammability.

The task of connecting a disconnecting quick disconnect is relatively straightforward and requires only minimal space for maneuvering by the workman to achieve the sealing or unsealing function. This then allows for packaging of adjacent components and closer spaced relationship within the airframe and affords both efficient coupling and uncoupling of the connector.

We claim:

1. Quick disconnect apparatus comprising:
   a first tube formed with a first extremity and including a peripheral bead adjacent the first extremity;
   a second tube formed with a second extremity for positioning in a coupling position relative to the first extremity;
   a compressible tubular seal device including a mounting cuff mounted on the second extremity and bonded thereto, the seal device including a cylindrical wall defining a cowling projecting beyond the second extremity to, when the first and second tubes are in the coupling position, project concentrically over the bead, the cowling further formed at its free extremity with an internal sealing ring configured to engage the first tube behind the bead and cooperating with the wall to, when so engaged, define a predetermined outside diameter at the free extremity of the cowling; and
   a tubular slider shell concentric with the seal device and shiftable axially there along from an uncoupling position retracted onto the second tube to a coupling position and including a mounting sleeve slidable on the seal device and a constraining collar projecting from the sleeve and shiftable, when the slider shell is slid to the coupling position, to align with the free extremity of the cowling and being further formed with an internal diameter smaller than the predetermined diameter to, when so aligned, compress the sealing ring radially inwardly into sealing engagement against the first tube.

2. The quick disconnect apparatus of claim 1 wherein:
   the seal device is constructed of a rubber material.

3. The quick disconnect apparatus of claim 1 wherein:
the slider shell is constructed of fiberglass.

4. The quick disconnect apparatus of claim 1 wherein:
the seal device is of integral construction.

5. The quick disconnect apparatus of claim 1 wherein:
the seal device is of one-piece construction.

6. The quick disconnect apparatus of claim 1 wherein:
the seal device is constructed of a rubber material having a hardness of substantially 45 on the A scale.

7. The quick disconnect apparatus of claim 1 wherein:
the seal device is constructed of a material that can elongate 400% without failing.

8. The quick disconnect apparatus of claim wherein:
the slider shell is constructed of fiberglass cloth and uncured phenolic resin.

9. The quick disconnect apparatus of claim 1 wherein:
the collar is sized to, when in the coupling position, compress the seal ring at least 10%.

10. The quick disconnect apparatus of claim 1 wherein:
the tubular seal device is elongated to form the mounting cuff with a cylindrical exterior surface formed in one location with an outwardly opening unlatching detent and formed in a second location spaced axially away from the one location with a radially outwardly opening latching detent; and
the sleeve configured with a radially inwardly projecting rib configured to be, when the slider shell is in its uncoupling position, received in the unlatching detent and to be, when the slider shell in the coupling position, received in the latching detent.

11. The quick disconnect apparatus of claim 1 wherein:
the cowling is formed interiorly at its opened end with a radially and distally outwardly sloping frusto conical cam surface for, when the cowling is telescoped over the bead, riding radially outwardly over the bead.

12. The quick disconnect apparatus of claim 1 wherein:
the slider shell is formed proximally with a radially inturned annular keeper flange for abutting against one end of the seal device when the slider shell is in its coupling position.

13. A quick disconnect device including:
first and second tubes configured to be coupled together, the first tube including a radially outwardly raised connecting bead;
a compressible seal device mounted on the second tube and configured with a cylindrical cowling projecting beyond the end of the second tube to be, when the tubes are to be coupled together, positioned radially over the bead, the cowling being further configured at its distal extremity with a radially inwardly projecting sealing ring for engaging the first tube; and
a tubular shell received on the seal device for axially sliding there along from a coupling position to an uncoupling position, the shell including collar means configured to, when the shell is in the coupling position, compress the cowling and sealing ring radially inwardly against the first tube.

14. A quick disconnect apparatus for connecting first and second tubes together, the first tube found with a peripheral bead and the apparatus comprising:
an elongated tubular seal device mounted on the second tube and configured with an axially projecting cowling configured to, when the tubes are abutted axially together in a coupling position, be reviewed over the first tube to register over the bead and including an interior sealing ring to engage behind the bead and responsive to radially inward compression thereof to seal against the first tube; and
a tubular slider shell received in sliding relationship on the seal device to be slid from a release to a constraining position and formed with constraining collar configured to, when the tubes are in the coupling position and the slider shell is in its constraining position, constrain the cowling inwardly to compress the sealing ring into sealing engagement with the first tube.

15. The quick disconnect apparatus of claim 14 wherein:
the seal device is constructed of a rubber material.

16. The quick disconnect apparatus of claim 14 wherein:
the slider shell is constructed of fiberglass.

17. The quick disconnect apparatus of claim 14 wherein:
the seal device is of inergral construction.

18. The quick disconnect apparatus of claim 14 wherein:
the seal device is of one-piece construction.

19. The quick disconnect apparatus of claim 14 wherein:
the seal device is constructed of a rubber material having a hardness of substantially 45 on the A scale.

20. The quick disconnect apparatus of claim 14 wherein:
the seal device is constructed of a material stretched that can elongate 400% without failing.

\* \* \* \* \*

UNITED STATES PATENT AND TRADEMARK OFFICE
CERTIFICATE OF CORRECTION

PATENT NO.          : 7,510,216 B2
APPLICATION NO.  : 11/351751
DATED                  : March 31, 2009
INVENTOR(S)         : Reg Tomerlin et al.

Page 1 of 1

It is certified that error appears in the above-identified patent and that said Letters Patent is hereby corrected as shown below:

Column 5, line 13, after "claim" insert --1--.

Column 6, line 35, delete "inergral" and insert --integral--.

Signed and Sealed this

Twenty-ninth Day of December, 2009

David J. Kappos
*Director of the United States Patent and Trademark Office*